(12) United States Patent
Yang et al.

(10) Patent No.: US 11,109,384 B2
(45) Date of Patent: Aug. 31, 2021

(54) COLLISION HANDLING FOR SEMI-PERSISTENT SCHEDULING SIGNALS

(71) Applicant: QUALCOMM Incorporated, San Diego, CA (US)

(72) Inventors: Wei Yang, San Diego, CA (US); Jing Sun, San Diego, CA (US); Jing Jiang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 38 days.

(21) Appl. No.: 16/588,687

(22) Filed: Sep. 30, 2019

(65) Prior Publication Data

US 2020/0112964 A1  Apr. 9, 2020

Related U.S. Application Data

(60) Provisional application No. 62/740,762, filed on Oct. 3, 2018.

(51) Int. Cl.
*H04W 72/04* (2009.01)
*H04W 28/04* (2009.01)

(52) U.S. Cl.
CPC ....... *H04W 72/0493* (2013.01); *H04W 28/04* (2013.01)

(58) Field of Classification Search
CPC combination set(s) only.
See application file for complete search history.

(56) References Cited

U.S. PATENT DOCUMENTS

| | | | |
|---|---|---|---|
| 2013/0201841 A1* | 8/2013 | Zhang | H04L 5/0055 370/252 |
| 2015/0098371 A1* | 4/2015 | Vajapeyam | H04L 1/1861 370/280 |
| 2016/0242176 A1 | 8/2016 | Sun et al. | |
| 2017/0289733 A1 | 10/2017 | Rajagopal et al. | |
| 2017/0303302 A1 | 10/2017 | Bagheri et al. | |
| 2019/0069285 A1* | 2/2019 | Chandrasekhar | H04B 7/0695 |
| 2020/0163067 A1* | 5/2020 | Phan | H04W 4/46 |
| 2020/0280961 A1* | 9/2020 | Lee | H04W 4/40 |

OTHER PUBLICATIONS

International Search Report and Written Opinion—PCT/US2019/054087—ISA/EPO—dated Jan. 3, 2020.

\* cited by examiner

*Primary Examiner* — Xavier S Wong
(74) *Attorney, Agent, or Firm* — Harrity & Harrity, LLP

(57) ABSTRACT

Various aspects of the present disclosure generally relate to wireless communication. In some aspects, a base station may identify a collision between a first resource for a downlink semi-persistent scheduled communication and a second resource for another downlink signal; and perform an action to mitigate the collision based at least in part on identifying the collision. In some aspects, a user equipment (UE) may identify a collision between a first resource for a downlink semi-persistently scheduled (SPS) communication and a second resource for another downlink signal; and determine an action, to be performed by a base station, to mitigate the collision based at least in part on identifying the collision; and selectively receive the downlink SPS communication or the other downlink signal based at least in part on the determination. Numerous other aspects are provided.

30 Claims, 7 Drawing Sheets

COLLISION HANDLING FOR SEMI-PERSISTENT SCHEDULING SIGNALS

CROSS-REFERENCE TO RELATED APPLICATION

This application claims priority to Provisional Patent Application No. 62/740,762, filed on Oct. 3, 2018, entitled "COLLISION HANDLING FOR SEMI-PERSISTENT SCHEDULING SIGNALS," which is hereby expressly incorporated by reference herein.

FIELD OF THE DISCLOSURE

Aspects of the present disclosure generally relate to wireless communication, and more particularly to techniques and apparatuses for collision handling for semi-persistent scheduling (SPS) signals.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include identifying a collision between a first resource for a downlink semi-persistently scheduled (SPS) communication and a second resource for another downlink signal; determining an action, to be performed by a base station, to mitigate the collision based at least in part on identifying the collision; and selectively receiving the downlink SPS communication or the other downlink signal based at least in part on the determination.

In some aspects, a UE for wireless communication may include memory and one or more processors operatively coupled to the memory. The memory and the one or more processors may be configured to identify a collision between a first resource for a downlink SPS communication and a second resource for another downlink signal; determine an action, to be performed by a base station, to mitigate the collision based at least in part on identifying the collision; and selectively receive the downlink SPS communication or the other downlink signal based at least in part on the determination.

In some aspects, a non-transitory computer-readable medium may store one or more instructions for wireless communication. The one or more instructions, when executed by one or more processors of a UE, may cause the one or more processors to identify a collision between a first resource for a downlink SPS communication and a second resource for another downlink signal; determine an action, to be performed by a base station, to mitigate the collision based at least in part on identifying the collision; and selectively receive the downlink SPS communication or the other downlink signal based at least in part on the determination.

In some aspects, an apparatus for wireless communication may include means for identifying a collision between a first resource for a downlink SPS communication and a second resource for another downlink signal; means for determining an action, to be performed by a base station, to mitigate the collision based at least in part on identifying the collision; and means for selectively receiving the downlink SPS communication or the other downlink signal based at least in part on the determination.

In some aspects, a method of wireless communication, performed by a base station, may include identifying a collision between a first resource for a downlink semi-persistent scheduled (SPS) communication and a second resource for another downlink signal; and performing an action to mitigate the collision based at least in part on identifying the collision.

In some aspects, a base station for wireless communication may include memory and one or more processors operatively coupled to the memory. The memory and the one or more processors may be configured to identify a collision between a first resource for a downlink semi-persistent scheduled (SPS) communication and a second resource for another downlink signal; and perform an action to mitigate the collision based at least in part on identifying the collision.

In some aspects, a non-transitory computer-readable medium may store one or more instructions for wireless communication. The one or more instructions, when executed by one or more processors of a base station, may cause the one or more processors to identify a collision between a first resource for a downlink semi-persistent scheduled (SPS) communication and a second resource for another downlink signal; and perform an action to mitigate the collision based at least in part on identifying the collision.

In some aspects, an apparatus for wireless communication may include means for identifying a collision between a first resource for a downlink semi-persistent scheduled (SPS) communication and a second resource for another downlink signal; and means for performing an action to mitigate the collision based at least in part on identifying the collision.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
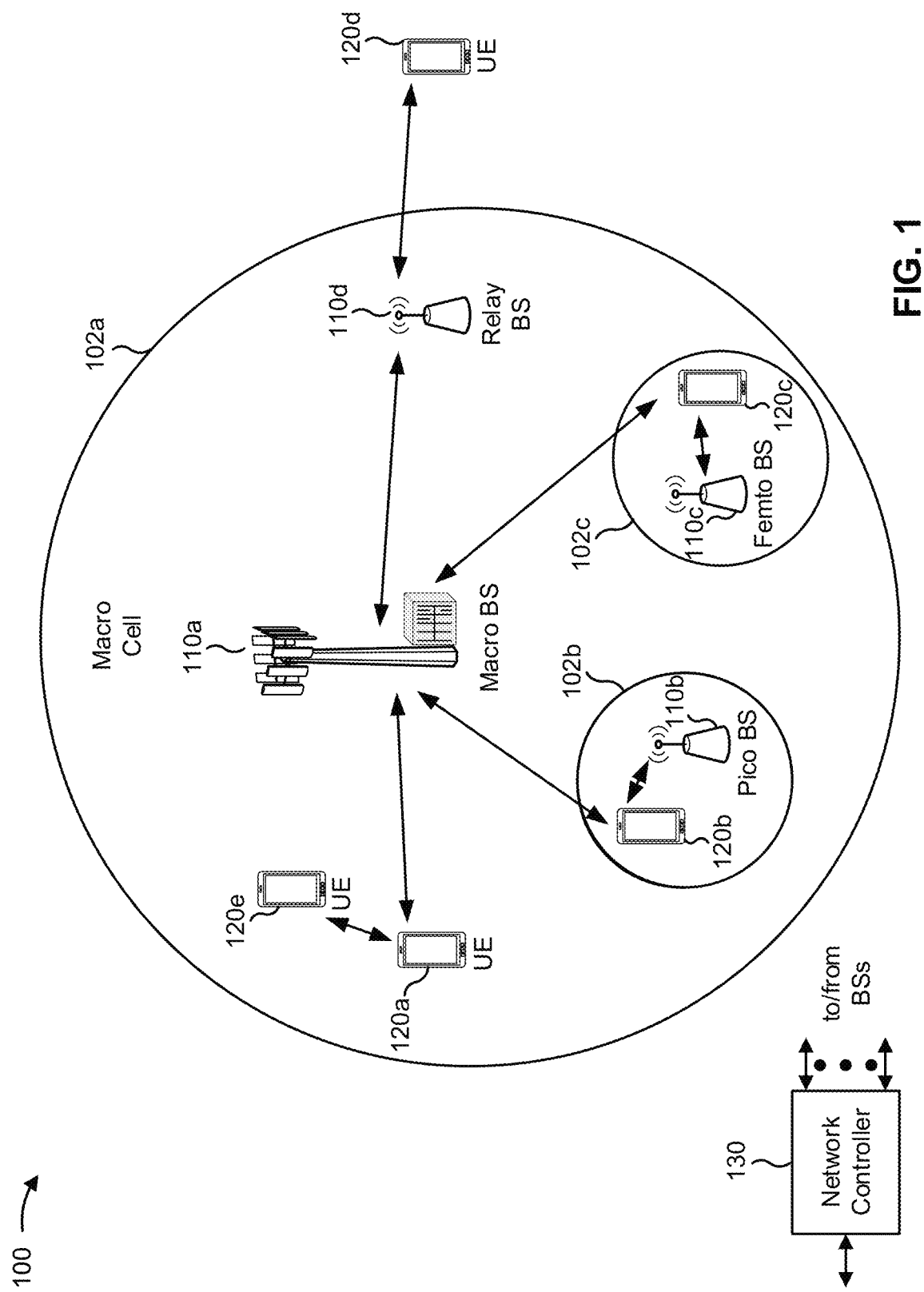
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples may differ from what is described with regard to FIG. 1.

Figure 2:
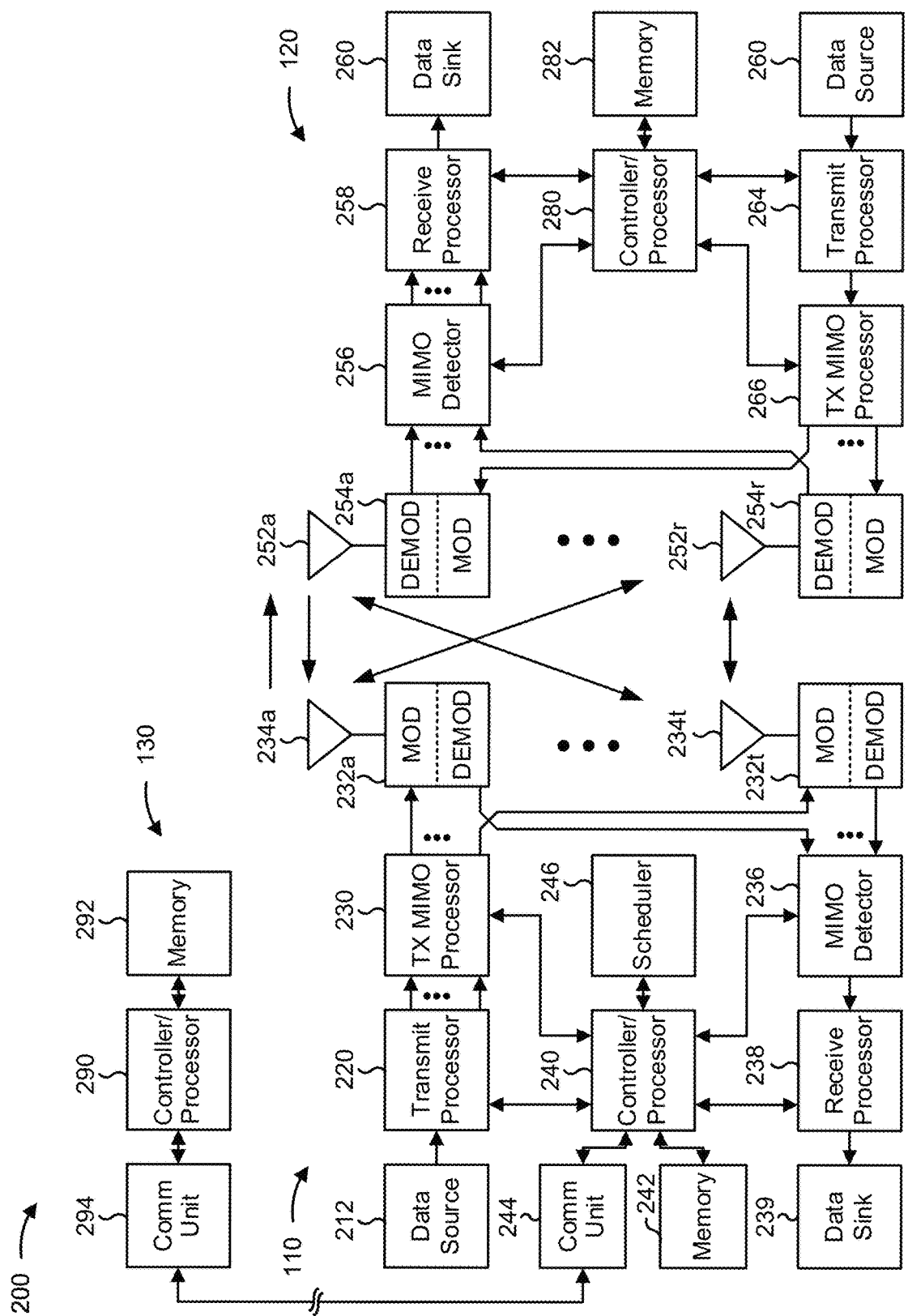
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with collision handling for SPS signals, as described in more detail elsewhere herein. For example, controller/processor 240 of base station 110, controller/processor 280 of UE 120, and/or any other component(s) of FIG. 2 may perform or direct operations of, for example, process 600 of FIG. 6 and/or other processes as described herein. Memories 242 and 282 may store data and program codes for base station 110 and UE 120, respectively. A scheduler 246 may schedule UEs for data transmission on the downlink and/or uplink.

In some aspects, a UE (e.g., UE 120) may include means for identifying a collision between a first resource for a downlink semi-persistently scheduled (SPS) communication and a second resource for another downlink signal; means for determining an action, to be performed by a base station, to mitigate the collision based at least in part on identifying the collision; means for selectively receiving the downlink SPS communication or the other downlink signal based at least in part on the determination; means for transmitting a negative acknowledgment for the downlink SPS communication; means for identifying the first resource as unavailable for a downlink data channel based at least in part on the collision; and/or the like. In some aspects, such means may include one or more components of UE 120 described in connection with FIG. 2.

In some aspects, a base station (e.g., BS 110) may include means for identifying a collision between a first resource for a downlink semi-persistently scheduled (SPS) communication and a second resource for another downlink signal; means for performing an action to mitigate the collision based at least in part on identifying the collision; means for canceling transmission of the downlink SPS communication or determining that the downlink SPS communication is not to be transmitted; means for canceling the transmission of the downlink SPS communication based at least in part on a configurable threshold associated with a ratio of overlapping resources or an effective rate of the downlink SPS communication; means for moving a demodulation reference signal of the downlink SPS communication to a third resource, wherein the third resource does not overlap the second resource; means for moving a demodulation reference signal of the downlink SPS communication to a third resource associated with a second pattern based at least in part on the third resource not overlapping the second resource; means for matching a data portion of the downlink SPS communication around an overlapping resource of the first resource and the second resource; means for puncturing the data portion of the downlink SPS communication on the overlapping resource; and/or the like. In some aspects, such means may include one or more components of BS 110 described in connection with FIG. 2.

As indicated above, FIG. 2 is provided merely as an example. Other examples may differ from what is described with regard to FIG. 2.

Semi-persistent scheduling (SPS) is a mechanism for providing periodic resource allocations for a downlink transmission. For example, an SPS configuration may be associated with a fixed resource block allocation. An SPS communication may be associated with a payload (e.g., a downlink shared channel) and a reference signal, such as a demodulation reference signal. In some radio access technologies, such as 5G/NR, downlink SPS communications may be scheduled at a shorter periodicity than in some legacy implementations to support periodic low-latency traffic. For example, a downlink SPS communication may be scheduled every 2 symbols, every 7 symbols, every slot, or at a different periodicity.

In the case of downlink SPS communications, it may be difficult to avoid collisions between the downlink SPS communications and other downlink signals, channels, or transmissions, particularly for downlink SPS communications with a short periodicity. In such a case, it may not be particularly helpful to always drop the colliding SPS communication, since this may impact performance of the downlink SPS communication. The other (e.g., colliding) downlink signals may include, for example, a synchronization signal or physical broadcast channel block (referred to herein as a synchronization signal block or an SS/PBCH block), a reference signal (e.g., a channel state information reference signal or another reference signal), a control resource set (CORESET), a rate-matched resource set, and/or the like.

Some techniques and apparatuses described herein provide techniques for mitigating collisions between a downlink SPS communication resource and a resource for another downlink signal or communication. For example, some techniques and apparatuses described herein provide for a base station to determine a resource allocation that mitigates the collision, to determine an action to perform to mitigate the collision, to transmit the communications in a way that mitigates the collision, and/or the like. In some aspects, some techniques and apparatuses described herein provide for a wireless communication device (e.g., a UE) to determine an action that may be performed by another wireless communication device (e.g., a base station) to mitigate the collision, to determine a resource allocation to be used to mitigate the collision, and/or the like. In this way, collision between a downlink SPS communication and another signal or communication is mitigated, thereby improving performance of the downlink SPS communication and the other signal or communication, particularly in the case of short-periodicity SPS communications.

Figure 3:
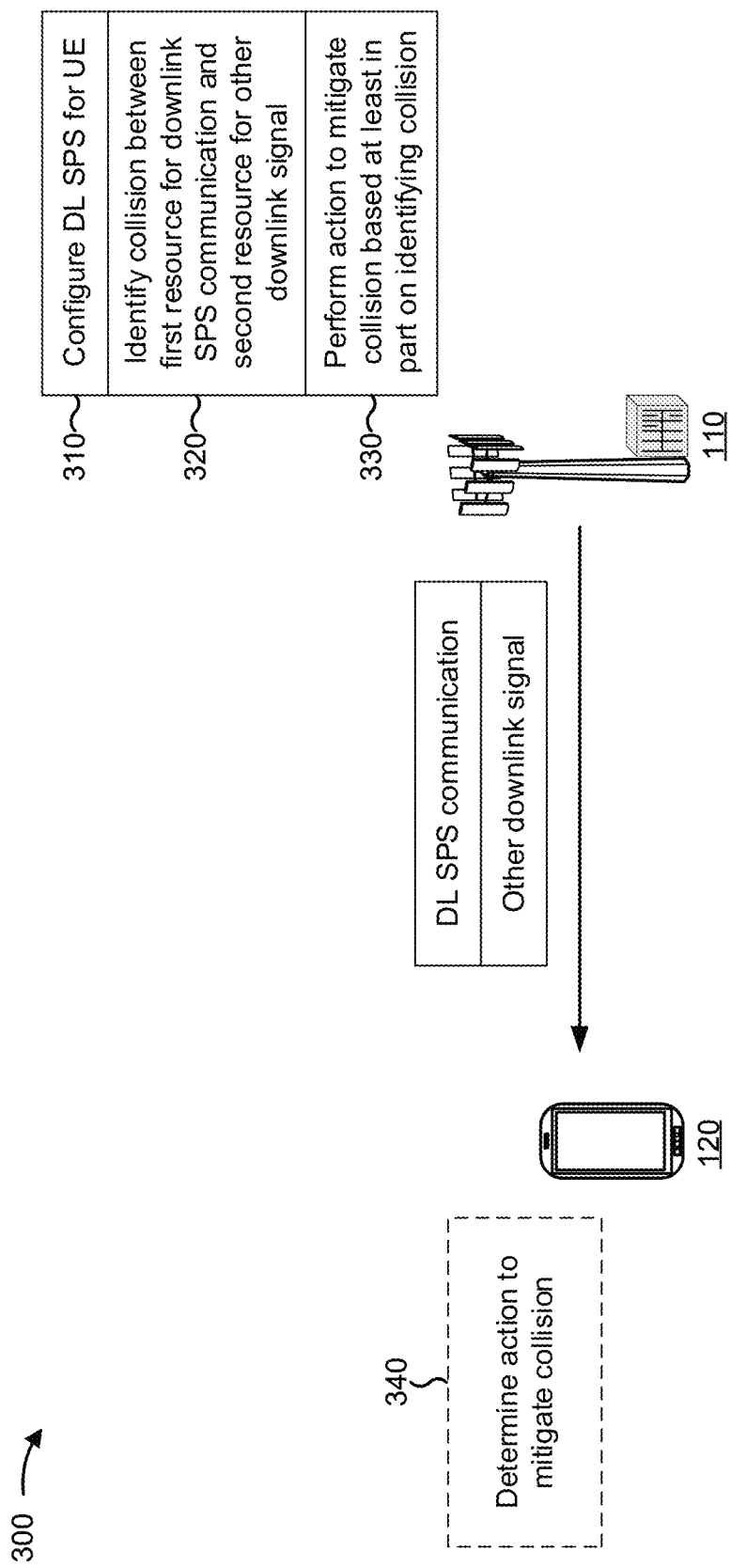
FIG. 3 is a diagram illustrating an example of collision handling for semi-persistent scheduling signals, in accordance with various aspects of the present disclosure.

FIG. 3 is a diagram illustrating an example 300 of collision handling for semi-persistently scheduled signals, in accordance with various aspects of the present disclosure.

As shown in FIG. 3, and by reference number 310, a BS 110 may configure a downlink SPS communication for a UE 120. In some aspects, the BS 110 may transmit configuration information, control information, scheduling information, and/or the like to configure the downlink SPS communication. In some aspects, the BS 110 may configure the downlink SPS communication for a first resource. For example, the first resource may repeat every N resources (e.g., symbols, slots, subframes, and/or the like), wherein N is an integer.

The downlink SPS communication may include or comprise a reference signal (e.g., a demodulation reference signal (DMRS) or another reference signal) and a data portion (e.g., a physical downlink shared channel (PDSCH) or another data channel). The UE 120 may be unable to decode the data portion if the reference signal is not successfully received. The first resource may include one or more resources (e.g., symbols, tones, and/or the like) to be used for the reference signal and the data portion.

As shown by reference number 320, the BS 110 may identify a collision between a first resource for the downlink SPS communication and a second resource for another downlink signal. In some aspects, the collision may be associated with, for example, high-priority traffic (e.g., ultra-reliable low-latency traffic), and/or the like. For example, the BS 110 may determine that the first resource and the second resource at least partially overlap. In some aspects, the other downlink signal may include a synchronization signal block, a rate-matched resource, a resource element-level reserved resource (e.g., a cell-specific reference signal, a zero-power channel state information reference signal, and/or the like), a channel state information reference signal, and/or the like.

In some aspects, the BS 110 may determine which part of the first resource or the second resource is associated with the collision. For example, the BS 110 may determine whether a part of the first resource associated with a reference signal of the downlink SPS communication, or a part of the first resource associated with a data portion of the downlink SPS communication, is associated with the collision. The BS 110 may select an action to perform based at least in part on the part of the first resource or the second resource that is associated with the collision.

As shown by reference number 330, the BS 110 may perform an action to mitigate the collision based at least in part on identifying the collision. In some aspects, the BS 110 may determine an action to perform, as described in more detail below. In some aspects, the BS 110 may perform scheduling of the downlink SPS communication and the other downlink signal based at least in part on the action to mitigate the collision. In some aspects, the action to mitigate the collision may be scheduling the downlink SPS communication and the other downlink signal to reduce or eliminate the collision. In this way, the BS 110 may reduce collisions between the downlink SPS communication and the other downlink signal.

In some aspects, the other downlink signal may include a synchronization signal block or a rate-matched resource set. For example, the other downlink signal may be associated with a resource block-level reserved resource. In some aspects, the BS 110 may cancel the downlink SPS communication. For example, the BS 110 may determine that the downlink SPS communication is not to be transmitted in the first resource. In some aspects, the BS 110 may move the downlink SPS communication to a third resource that does not overlap or collide with the second resource. For example, when the other downlink communication collides with a DMRS of the downlink SPS communication, the BS 110 may move the DMRS to the third resource, and/or may rate match a data portion of the downlink SPS communication. This is described in more detail in connection with FIG. 4, below.

In some aspects, the BS 110 may selectively cancel transmission of the downlink SPS communication (or may determine that the downlink SPS communication is not to be transmitted). For example, the BS 110 may selectively cancel the transmission of the downlink SPS communication based at least in part on a threshold or condition. As one example, the BS 110 may cancel the transmission based at least in part on determining that a ratio of overlapping data portion resources (e.g., of the first resource and the second resource) satisfies a threshold. The threshold may be configurable (e.g., using radio resource control messaging or another technique). As another example, the BS 110 may cancel the transmission when an effective rate of the data portion of the downlink SPS communication is greater than a scheduled rate of the data portion (e.g., signaled using a modulation and coding scheme value) by a threshold amount. As a third example, the BS 110 may cancel the transmission of the downlink SPS communication when no resource is available for the DMRS of the downlink SPS communication (e.g., when the other downlink signal occupies an entirety of the downlink SPS communication).

In some aspects, the other downlink signal may include a resource element-level reserved resource, such as a cell-specific reference signal or a zero power channel state information reference signal, a non-zero-power channel state information reference signal, and/or the like. In such a case, if a DMRS of the downlink SPS communication collides with a resource of the other downlink signal, then the BS 110 may move the DMRS to another resource. For example, if a first DMRS group of a symbol is used for the downlink SPS communication, and/or if resources for a second DMRS group of the symbol are available (e.g., if resources for a second DMRS group of the symbol are not allocated to another UE, or to another DMRS port of the same UE), and/or if the resources for the second DMRS group do not collide with the other downlink signal, then the BS 110 may move the DMRS to the resources of the second DMRS group. If the above conditions are not satisfied (e.g., if the resources of the second DMRS group are not available or collide with the other downlink signal), then the BS 110 may move the DMRS to another symbol that does not collide with the other downlink signal. In the above cases, the BS 110 may rate match a data portion of the downlink SPS communication around the occupied resources, or may puncture a data portion of the downlink SPS communication. For a more detailed description of collision mitigation in the resource element-level reserved resource case, refer to the description of FIG. 5, below.

In some aspects, the first resource and the second resource may be associated with the same symbol (e.g., the same OFDM symbol). In such a case, the first resource need not overlap the second resource in the frequency domain for a collision to occur. For example, if the downlink SPS communication and the other downlink signal are associated with different spatial quasi-collocation (QCL) assumptions, then it may be impossible to transmit the downlink SPS communication and the other downlink signal using a single beam on overlapping OFDM symbols.

In some aspects, when the downlink SPS communication and the other downlink signal are scheduled for the same symbol with different QCL assumptions (e.g., QCL configurations), then the BS 110 may determine an action to perform based at least in part on a priority rule. For example, the BS 110 may selectively cancel the downlink SPS communication, or the other downlink signal, based at least in part on respective priority levels associated with the downlink SPS communication and the other signal. As another example, the BS 110 may cancel the downlink SPS communication when the downlink SPS communication and the other downlink signal are scheduled on overlapping OFDM symbols with different QCL assumptions, regardless of whether the frequency resources for the downlink SPS communication and the other downlink signal overlap or not.

In some aspects, when the downlink SPS communication and the other downlink signal are scheduled for the same symbol with different QCL assumptions, then the BS 110 may determine that the symbol is unavailable for the downlink SPS communication, and may move a DMRS of the downlink data channel to a non-colliding symbol. In such a case, the BS 110 may rate match the data channel accordingly (e.g., the BS 110 may rate match the data portion of the downlink SPS communication around the overlapping OFDM symbol, and around the DMRS of the downlink SPS communication).

In some aspects, the downlink SPS communication may be scheduled on OFDM symbols 1, 2, . . . , K, and the other signal may be scheduled on a subset (2, 3, . . . , K-1). That is, there may be parts of the downlink SPS communication that are scheduled before the other signal and parts that are scheduled after the other signal. In this case, when the UE 120 and/or the network does not have contemporaneous multi-beam reception/transmission capability, then the downlink SPS communication may not be transmitted on the overlapping symbols. However, since the downlink SPS communication is divided into two non-contiguous parts, both parts may need to contain DMRS in order for the BS 110 to decode the data correctly. For example, since there is a beam direction transition between the two-part transmission, the BS 110 may not be able to maintain a phase coherence between the two parts. Hence, the channel estimated from the first part of the downlink SPS communication may be different from the channel estimated in the second part of the downlink SPS communication. Thus, channel estimation results cannot be shared across the two parts of the transmission. In this case, the BS 110 may perform one or more of the below actions.

In some aspects, the BS 110 may transmit the DMRS in both parts, and may rate-match data around the DMRS. For example, if the original downlink SPS communication contains 2 DMRS symbols, then by moving some DMRS symbols if necessary, the BS 110 may guarantee that both parts contain DMRS symbol.

In some aspects, the BS 110 may transmit only one part (e.g., the part that contains DMRS), and may cancel the part that does not contain DMRS. For example, this may occur when the original downlink SPS communication only contains 1 DMRS symbol or if one of the parts does not include enough resources to transmit both the DMRS and the corresponding data.

In some aspects, the BS 110 may cancel the transmission, for example, based at least in part on the BS 110 not being able to transmit DMRS in both parts or the downlink SPS communication being cut into two non-contiguous parts.

In some aspects, the UE 120 may be associated with a multi-panel reception capability, meaning that the UE 120 may be capable of contemporaneous reception of two or more downlink signals with different spatial QCL information. In that case, the UE 120 may signal a maximum number of contemporaneous receptions that the UE 120 is capable of receiving. The BS 110 may select a number of colliding downlink signals to be transmitted to the UE 120 based at least in part on respective priorities of the colliding downlink signals. In that case, the BS 110 may perform one or more additional actions described elsewhere herein to mitigate the collision of the colliding downlink signals when transmitting the colliding downlink signals.

In some aspects, the BS 110 may select the number of colliding downlink signals based at least in part on a capability of a network associated with the BS 110 and/or the UE 120. For example, the BS 110 may select the number of colliding downlink signals based at least in part on a number of contemporaneous transmissions, to the UE 120, that the network is capable of performing or configured to perform (e.g., based at least in part on a number of transmit-receive points (TRPs), antenna panels, and/or the like available to the network for transmitting to the UE 120).

As shown by reference number 340, in some aspects, the UE 120 may determine the action performed by the BS 110 to mitigate the collision. For example, the UE 120 may determine that the downlink SPS communication collides with (e.g., overlaps) the other downlink signal (e.g., based at least in part on scheduling information, a configuration of the UE 120, and/or the like), and may determine the action to be performed by the BS 110 to mitigate the collision. In this way, the UE 120 may determine the action to be performed without explicit signaling of the action by the BS 110, thereby reducing overhead associated with mitigating the collision.

In some aspects, if the downlink SPS communication is canceled, the UE 120 may send a NACK to the BS 110 for the canceled transmission or may not send any ACK/NACK for the canceled transmission. In the case when the downlink SPS communication is canceled, the UE 120 may still receive the other uncanceled signals. For example, if the downlink SPS communication collides with a downlink channel state information reference signal (CSI-RS), and the downlink SPS communication is canceled, the UE 120 may still receive the CSI-RS.

As indicated above, FIG. 3 is provided as an example. Other examples may differ from what is described with respect to FIG. 3.

Figure 4:
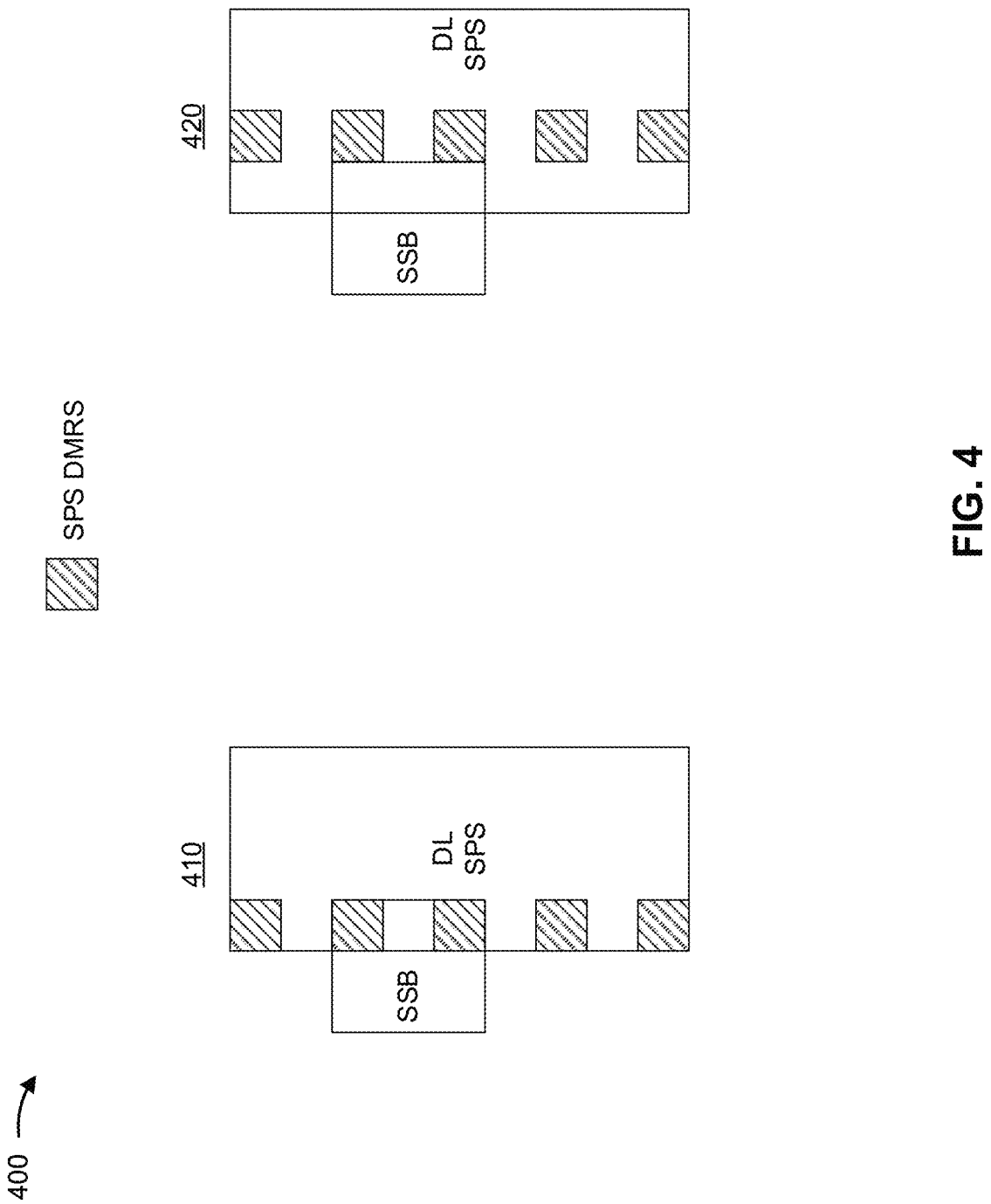
FIG. 4 is a diagram illustrating an example of collision handling for semi-persistent scheduling signals for a synchronization signal block or a rate-matched resource, in accordance with various aspects of the present disclosure.

FIG. 4 is a diagram illustrating an example 400 of collision handling for semi-persistent scheduling signals for a synchronization signal block or a rate-matched resource, in accordance with various aspects of the present disclosure. FIG. 4 shows resource allocations for a synchronization signal block (shown as SSB) and a downlink SPS communication. A DMRS of the downlink SPS communication is shown by the squares with diagonal hatching, and a remainder of the downlink SPS communication is a data channel of the downlink SPS communication. The horizontal direction in FIG. 4 represents time and the vertical direction in FIG. 4 represents frequency. Here, the DMRS of the downlink SPS communication is provided in a single OFDM symbol.

Reference number 410 shows a collision between the synchronization signal block and the downlink SPS communication. As can be seen, the synchronization signal block collides with one or more DMRSs of the downlink SPS communication. This may impact reception of the downlink SPS communication, since demodulation of the downlink SPS communication may be difficult or impossible if the DMRS is interrupted, punctured, or blocked.

Reference number 420 shows an action to mitigate the collision. As can be seen, the DMRS may be moved to a resource (e.g., an OFDM symbol) that does not collide with the synchronization signal block. In some aspects, the resource may be a next available OFDM symbol (e.g., a next available OFDM symbol that does not overlap with the synchronization signal block). The data channel of the downlink SPS communication may be rate-matched accordingly. In this way, the collision between the downlink SPS communication and the other downlink symbol (e.g., the synchronization signal block) is mitigated. In some aspects, if there is no OFDM symbol available for the DMRS transmission (e.g., if all OFDM symbols of the downlink SPS communication overlap with the synchronization signal block), then the downlink SPS communication may be canceled (e.g., may not be transmitted from the BS 110).

As indicated above, FIG. 4 is provided as an example. Other examples may differ from what is described with respect to FIG. 4.

Figure 5:
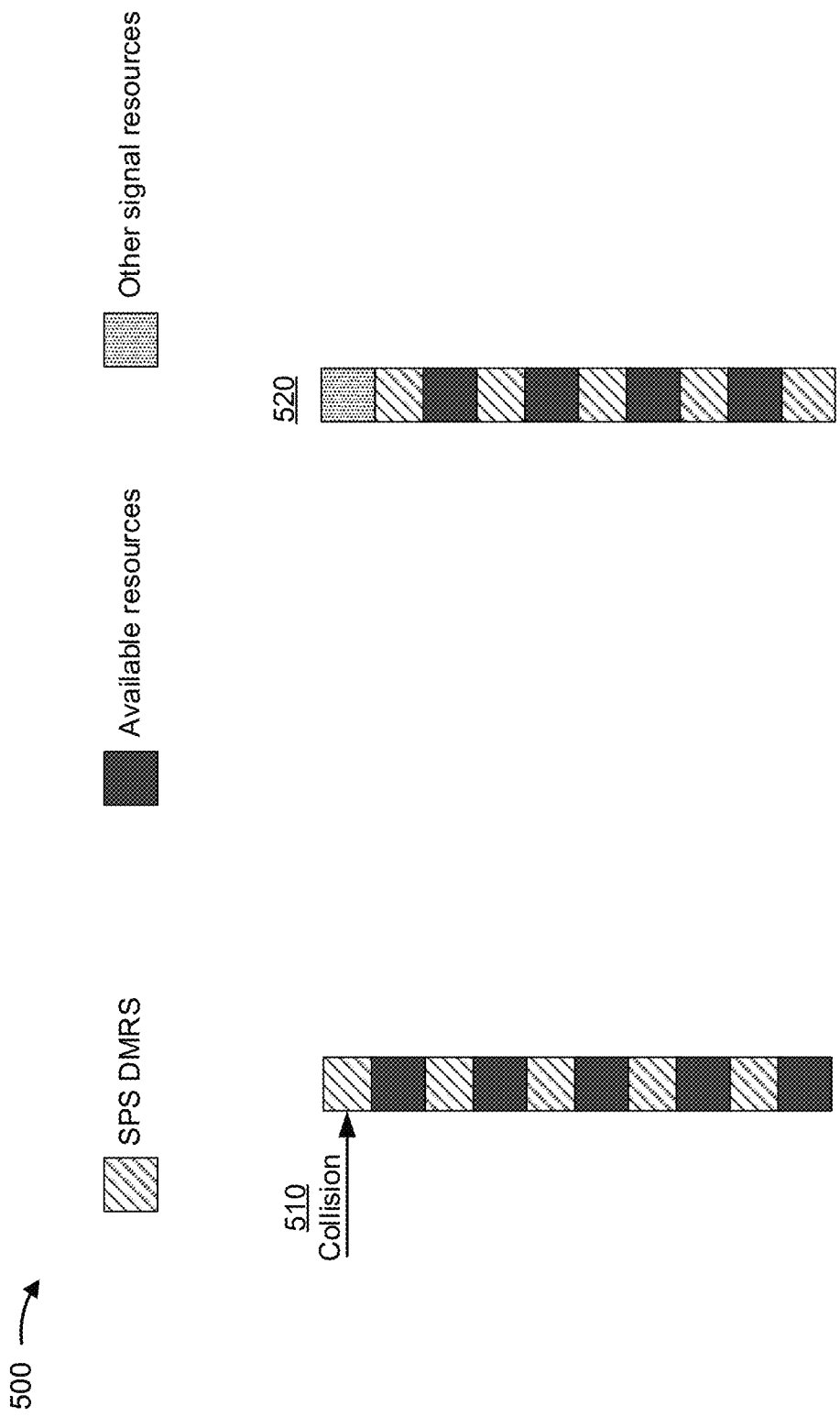
FIG. 5 is a diagram illustrating an example of collision handling for semi-persistent scheduling signals for a resource element-level reserved resource or a reference signal, in accordance with various aspects of the present disclosure.

FIG. 5 is a diagram illustrating an example 500 of collision handling for semi-persistent scheduling signals for a resource element-level reserved resource or a reference signal, in accordance with various aspects of the present disclosure. FIG. 5 shows resource allocations for a resource element-level resource allocation and a downlink SPS communication. The horizontal direction in FIG. 5 represents time and the vertical direction in FIG. 5 represents frequency. Resources of a single OFDM symbol are shown before collision mitigation (on the left) and after collision mitigation (on the right). A DMRS of the downlink SPS communication is shown by the squares with diagonal hatching. The DMRS may be associated with a pattern, such as a first comb in a comb-2 structure. In the comb-2 structure shown in FIG. 5, the DMRS is transmitted on the first comb (e.g., using even-indexed resource elements starting from zero). A second pattern of resources is shown using a gray fill. For example, the second pattern may be a second comb pattern. The second comb pattern is the second comb in the comb-2 structure (e.g., odd-indexed resource elements). The first pattern may be for a DMRS for a first UE (e.g., UE 120) and the second pattern may be for a DMRS for a second UE (e.g., UE 120) or other signal. Here, the resources of the second pattern are available (e.g., not being used for the second UE). Here, the DMRS of the downlink SPS communication is provided in a single OFDM symbol. A UE (e.g., UE 120) may determine whether the second comb (e.g., the grey resources in FIG. 5, or the odd-indexed resource elements) is occupied by another UE based at least in part on the DMRS port indication received from a base station in an activation downlink control information (DCI).

As shown by reference number 510, a collision may occur with regard to the DMRS and another downlink signal. As shown by reference number 520, when the resources of the second pattern are available, the BS 110 may shift the DMRS to the resources of the second pattern. Thus, the other signal can be transmitted in the overlapping resource (shown using dotted fill) and the DMRS can be transmitted in the second pattern. If the second pattern were occupied, the BS 110 might cancel transmission of the DMRS (and therefore the downlink SPS communication), move the DMRS to a later available OFDM symbol, or may perform a different action.

As indicated above, FIG. 5 is provided as an example. Other examples may differ from what is described with respect to FIG. 5.

Figure 6:
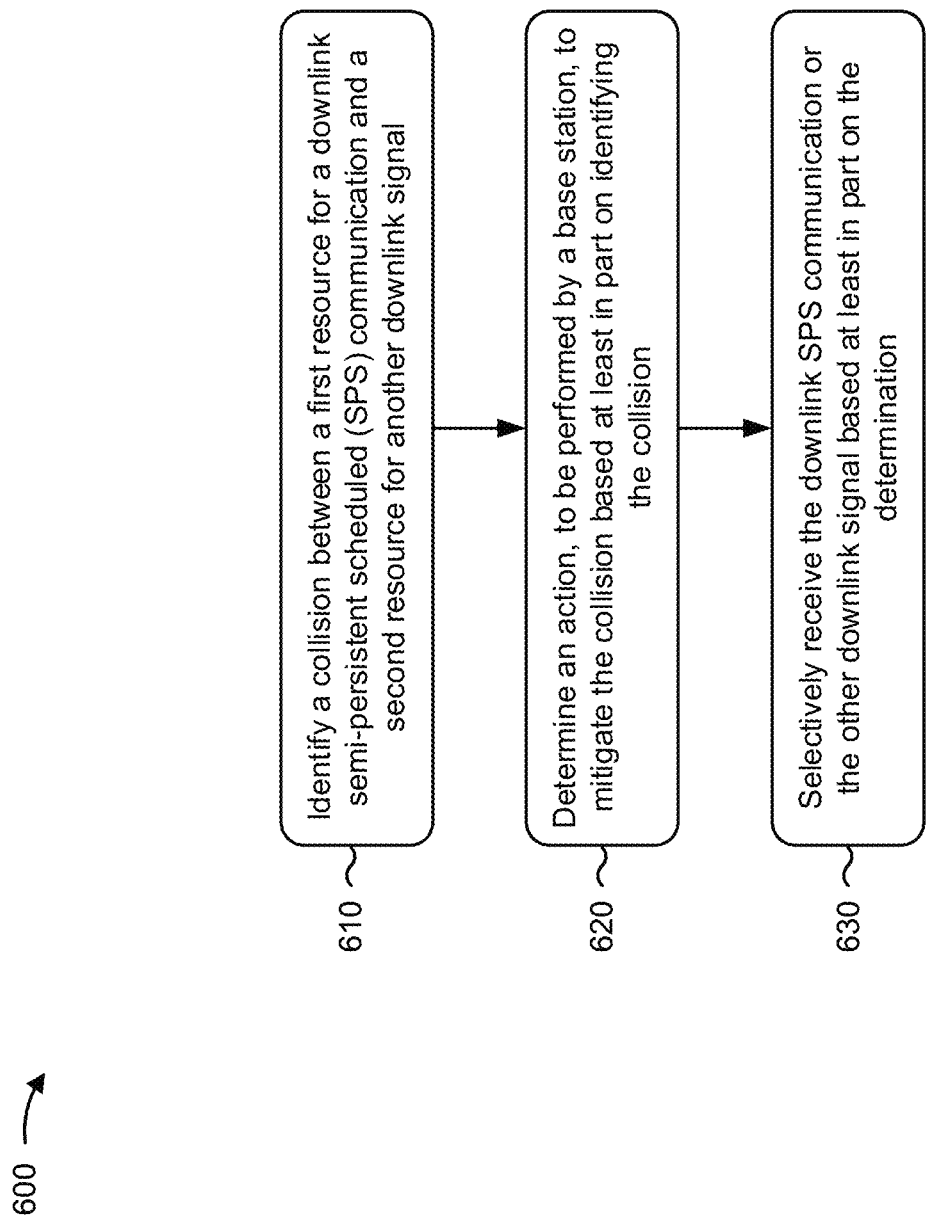
FIG. 6 is a diagram illustrating an example process performed, for example, by a user equipment, in accordance with various aspects of the present disclosure.

FIG. 6 is a diagram illustrating an example process 600 performed, for example, by a UE, in accordance with various aspects of the present disclosure. Example process 600 is an example where a UE (e.g., UE 120, and/or the like) performs collision handling for an SPS signal.

As shown in FIG. 6, in some aspects, process 600 may include identifying a collision between a first resource for a downlink semi-persistently scheduled (SPS) communication and a second resource for another downlink signal (block 610). For example, the base station (e.g., using controller/processor 240, transmit processor 220, TX MIMO processor 230, MOD 232, antenna 234, and/or the like) may identify a collision. The collision may be between a first resource for a downlink SPS communication and a second resource for another downlink signal.

As shown in FIG. 6, in some aspects, process 600 may include determining an action, to be performed by a base station, to mitigate the collision based at least in part on identifying the collision (block 620). For example, the UE (e.g., using antenna 252, DEMOD 254, MIMO detector 256, receive processor 258, controller/processor 280, and/or the like) may determine an action, to be performed by a base station (e.g., BS 110), to mitigate the collision based at least in part on identifying the collision. The action may include one or more of the actions described in connection with FIGS. 3-5, above.

As shown in FIG. 6, in some aspects, process 600 may include selectively receiving the downlink SPS communication and the other downlink signal based at least in part on the determination (block 630). For example, the UE (e.g., using antenna 252, DEMOD 254, MIMO detector 256, receive processor 258, controller/processor 280, and/or the like) may selectively receive the downlink SPS communication or the other downlink signal. The UE may selectively receive the downlink SPS communication and/or the other downlink signal based at least in part on the determination.

Process 600 may include additional aspects, such as any single aspect or any combination of aspects described below and/or in connection with one or more other processes described elsewhere herein.

In a first aspect, the first resource is for a demodulation reference signal of the downlink SPS communication. In a second aspect, alone or in combination with the first aspect, the action may include canceling transmission of the downlink SPS communication. In a third aspect, alone or in combination with the first aspect and/or the second aspect, the wireless communication device may transmit a negative acknowledgment for the downlink SPS communication. In a fourth aspect, alone or in combination with any one or more of the first through third aspects, the wireless communication device may receive the other downlink signal based at least in part on the downlink SPS communication being canceled. In a fifth aspect, alone or in combination with any one or more of the first through fourth aspects, canceling the transmission includes canceling the transmission of the downlink SPS communication based at least in part on a configurable threshold associated with a ratio of overlapping resources or an effective rate of the downlink SPS communication. In a sixth aspect, alone or in combination with any one or more of the first through fifth aspects, canceling the transmission of the downlink SPS communication is based at least in part on there being no resource available or limited resource availability (e.g., no resource availability, resource availability that fails to satisfy a threshold, and/or the like) for a demodulation reference signal of the downlink SPS communication.

In a seventh aspect, alone or in combination with any one or more of the first through sixth aspects, the action may include determining that the downlink SPS communication is not to be transmitted. In an eighth aspect, alone or in combination with any one or more of the first through seventh aspects, the action may include may moving a demodulation reference signal of the downlink SPS communication to a third resource, wherein the third resource does not overlap the second resource. In some aspects, the third resource is a next sequential resource that does not overlap the second resource.

In a ninth aspect, alone or in combination with any one or more of the first through eighth aspects, the other downlink signal is associated with a synchronization signal block or a rate-matched resource set. In a tenth aspect, alone or in combination with any one or more of the first through ninth aspects, the other downlink signal is associated with a resource element-level reserved resource or a channel state information reference signal. In an eleventh aspect, alone or in combination with any one or more of the first through tenth aspects, the first resource is associated with a first pattern. The action may include moving a demodulation reference signal of the downlink SPS communication to a third resource associated with a second pattern based at least in part on the third resource not overlapping the second resource.

In a twelfth aspect, alone or in combination with any one or more of the first through eleventh aspects, the action may include rate matching a data portion of the downlink SPS communication around an overlapping resource of the first resource and the second resource. In a thirteenth aspect, alone or in combination with any one or more of the first through twelfth aspects, the action may include puncturing a data portion of the downlink SPS communication on an overlapping resource of the first resource and the second resource. In a fourteenth aspect, alone or in combination with any one or more of the first through thirteenth aspects, the first resource and the second resource are associated with a same symbol, and the downlink SPS communication and the other downlink signal are associated with a different spatial quasi-collocation configuration.

In a fifteenth aspect, alone or in combination with any one or more of the first through fourteenth aspects, the action may include identifying the first resource as unavailable for a downlink data channel based at least in part on the collision. In a sixteenth aspect, alone or in combination with any one or more of the first through fifteenth aspects, the action is based at least in part on a priority rule associated with the downlink SPS communication and the other downlink signal.

In a seventeenth aspect, alone or in combination with any one or more of the first through sixteenth aspects, the action is based at least in part on a capability of a recipient of the downlink SPS communication relating to contemporaneous reception of multiple spatial beams. In an eighteenth aspect, alone or in combination with any one or more of the first through seventeenth aspects, the collision is between the SPS signal and multiple other downlink signals including the other signal, and a subset of the SPS signal and the multiple other downlink signals is selected for transmission based at least in part on the capability.

In a nineteenth aspect, alone or in combination with any one or more of the first through eighteenth aspects, the action is based at least in part on whether a network associated with the wireless communication device is configured to perform contemporaneous transmission of multiple spatial beams for the downlink SPS communication and the other downlink signal.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
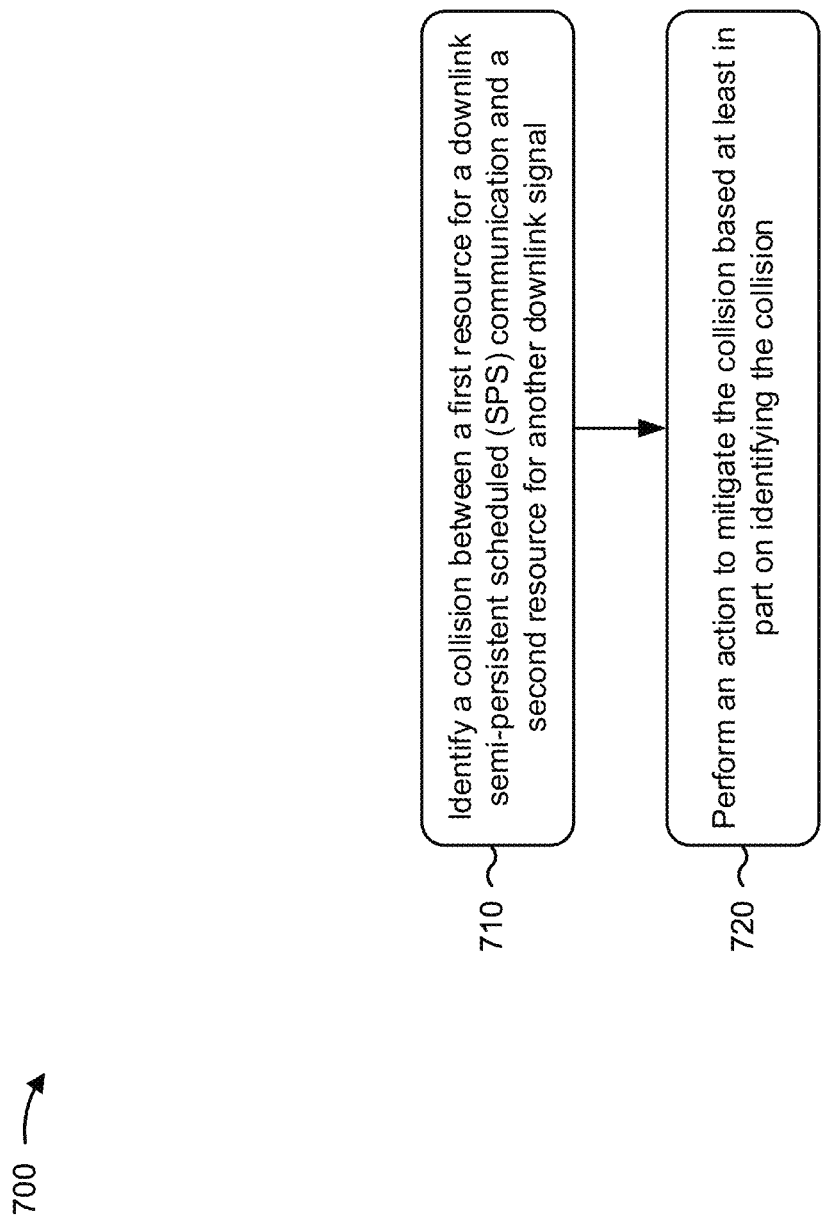
FIG. 7 is a diagram illustrating an example process performed, for example, by a base station, in accordance with various aspects of the present disclosure.

FIG. 7 is a diagram illustrating an example process 700 performed, for example, by a base station, in accordance with various aspects of the present disclosure. Example process 700 is an example where a base station (e.g., BS 110, and/or the like) performs collision handling for an SPS signal.

As shown in FIG. 7, in some aspects, process 700 may include identifying a collision between a first resource for a downlink semi-persistent scheduled (SPS) communication and a second resource for another downlink signal (block 710). For example, the base station (e.g., using controller/processor 240, controller/processor 280, and/or the like) may identify a collision. The collision may be between a first resource for a downlink SPS communication and a second resource for another downlink signal.

As shown in FIG. 7, in some aspects, process 700 may include performing an action to mitigate the collision based at least in part on identifying the collision (block 720). For example, the base station (e.g., using controller/processor 240, transmit processor 220, TX MIMO processor 230, MOD 232, antenna 234, controller/processor 280, transmit processor 264, TX MIMO processor 266, MOD 254, antenna 252, and/or the like) may perform an action to mitigate the collision. The base station may perform the action based at least in part on identifying the collision. The action may include one or more of the actions described in connection with FIGS. 3-5, above.

Process 700 may include additional aspects, such as any single aspect or any combination of aspects described below and/or in connection with one or more other processes described elsewhere herein.

In a first aspect, the first resource is for a demodulation reference signal of the downlink SPS communication. In a second aspect, alone or in combination with the first aspect, the base station may cancel transmission of the downlink SPS communication. In a third aspect, alone or in combination with the first aspect and/or the second aspect, the base station may cancel the transmission of the downlink SPS communication based at least in part on a configurable threshold associated with a ratio of overlapping resources or an effective rate of the downlink SPS communication. In a fourth aspect, alone or in combination with any one or more of the first through third aspects, canceling the transmission of the downlink SPS communication is based at least in part on there being no resource available for a demodulation reference signal of the downlink SPS communication.

In a fifth aspect, alone or in combination with any one or more of the first through fourth aspects, the base station may determine that the downlink SPS communication is not to be transmitted. In a sixth aspect, alone or in combination with any one or more of the first through fifth aspects, the base station may move a demodulation reference signal of the downlink SPS communication to a third resource, wherein the third resource does not overlap the second resource. In a seventh aspect, alone or in combination with any one or more of the first through sixth aspects, the third resource is a next sequential resource that does not overlap the second resource.

In an eighth aspect, alone or in combination with any one or more of the first through seventh aspects, the other downlink signal is associated with a synchronization signal block or a rate-matched resource set. In a ninth aspect, alone or in combination with any one or more of the first through eighth aspects, the other downlink signal is associated with a resource element-level reserved resource or a channel state information reference signal. In a tenth aspect, alone or in combination with any one or more of the first through ninth aspects, the first resource is associated with a first pattern. The base station may move a demodulation reference signal of the downlink SPS communication to a third resource associated with a second pattern based at least in part on the third resource not overlapping the second resource.

In an eleventh aspect, alone or in combination with any one or more of the first through tenth aspects, the base station may rate match a data portion of the downlink SPS communication around an overlapping resource of the first resource and the second resource. In a twelfth aspect, alone or in combination with any one or more of the first through third aspects, the base station may puncture a data portion of the downlink SPS communication on an overlapping resource of the first resource and the second resource. In a thirteenth aspect, alone or in combination with any one or more of the first through twelfth aspects, the first resource and the second resource are associated with a same symbol, and the downlink SPS communication and the other downlink signal are associated with a different spatial quasi-collocation configuration.

In a fourteenth aspect, alone or in combination with any one or more of the first through thirteenth aspects, the base station may identify the first resource as unavailable for a downlink data channel based at least in part on the collision. In a fifteenth aspect, alone or in combination with any one or more of the first through fourteenth aspects, the action is based at least in part on a priority rule associated with the downlink SPS communication and the other downlink signal.

In a sixteenth aspect, alone or in combination with any one or more of the first through third aspects, the action is based at least in part on a capability of a recipient of the downlink SPS communication relating to contemporaneous reception of multiple spatial beams. In a seventeenth aspect, alone or in combination with any one or more of the first through sixteenth aspects, the collision is between the SPS signal and multiple other downlink signals including the other signal, and a subset of the SPS signal and the multiple other downlink signals is selected for transmission based at least in part on the capability.

In an eighteenth aspect, alone or in combination with any one or more of the first through seventeenth aspects, the action is based at least in part on whether a network associated with the base station is configured to perform contemporaneous transmission of multiple spatial beams for the downlink SPS communication and the other downlink signal.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c"

is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   identifying a collision between a first resource for a downlink semi-persistently scheduled (SPS) communication and a second resource for another downlink signal;
   determining an action, to be performed by a base station, to mitigate the collision based at least in part on identifying the collision,
      wherein the action comprises at least one of:
         moving a demodulation reference signal of the downlink SPS communication to a third resource that is a next sequential resource after the second resource and that does not overlap the second resource, or
         canceling a transmission of the downlink SPS communication based at least in part on a threshold associated with a ratio of overlapping resources, an effective rate of the downlink SPS communication, or a limited resource availability for the demodulation reference signal of the downlink SPS communication; and
   selectively receiving the downlink SPS communication or the other downlink signal based at least in part on the determination.

2. The method of claim 1, wherein the first resource is for the demodulation reference signal of the downlink SPS communication.

3. The method of claim 1, further comprising:
   transmitting a negative acknowledgment for the downlink SPS communication.

4. The method of claim 1, wherein the action comprises canceling the transmission of the downlink SPS communication.

5. The method of claim 4, wherein canceling the transmission of the downlink SPS communication is based at least in part on the threshold associated with the ratio of overlapping resources or the effective rate of the downlink SPS communication.

6. The method of claim 1, wherein canceling the transmission of the downlink SPS communication is based at least in part on the limited resource availability.

7. The method of claim 1, wherein the action comprises the moving the demodulation reference signal of the downlink SPS communication.

8. The method of claim 1, wherein the other downlink signal is associated with at least one of:
   a synchronization signal block,
   a rate-matched resource set,
   a resource element-level reserved resource, or
   a channel state information reference signal.

9. The method of claim 1, wherein the first resource is associated with a first pattern, and wherein the third resource is associated with a second pattern.

10. The method of claim 1, wherein the action further comprises at least one of:
    rate matching a data portion of the downlink SPS communication around an overlapping resource of the first resource and the second resource, or
    puncturing the data portion of the downlink SPS communication on the overlapping resource.

11. The method of claim 1, wherein the first resource and the second resource are associated with a same symbol, and wherein the downlink SPS communication and the other downlink signal are associated with different spatial quasi-collocation configurations.

12. The method of claim 11, further comprising:
    identifying the first resource as unavailable for a downlink data channel based at least in part on the collision.

13. The method of claim 1, wherein the action is based at least in part on a priority rule associated with the downlink SPS communication and the other downlink signal.

14. The method of claim 1, wherein the action is based at least in part on a capability of a recipient of the downlink SPS communication relating to contemporaneous reception of multiple spatial beams.

15. The method of claim 14, wherein the collision is between the downlink SPS communication and multiple other downlink signals including the other downlink signal, and wherein the action further comprises selecting a subset of the downlink SPS communication and the multiple other downlink signals for transmission based at least in part on the capability.

16. The method of claim 1, wherein the action is based at least in part on whether a network associated with the UE is configured to perform contemporaneous transmission of multiple spatial beams for the downlink SPS communication and the other downlink signal.

17. The method of claim 1, wherein the action comprises moving the demodulation reference signal and canceling the transmission of the downlink SPS communication.

18. A method of wireless communication performed by a base station, comprising:
    identifying a collision between a first resource for a downlink semi-persistently scheduled (SPS) communication and a second resource for another downlink signal; and
    performing an action to mitigate the collision based at least in part on identifying the collision,
       wherein performing the action comprises at least one of:
          moving a demodulation reference signal of the downlink SPS communication to a third resource that is a next sequential resource after the second resource and that does not overlap the second resource, or
          canceling a transmission of the downlink SPS communication based at least in part on a threshold associated with a ratio of overlapping resources, an effective rate of the downlink SPS communication, or a limited resource availability for the demodulation reference signal of the downlink SPS communication.

19. The method of claim 18, wherein the first resource is for the demodulation reference signal of the downlink SPS communication.

20. The method of claim 18, wherein performing the action comprises canceling the transmission of the downlink SPS communication.

21. The method of claim 18, wherein canceling the transmission of the downlink SPS communication is based at least in part on the limited resource availability.

22. The method of claim 18, wherein performing the action comprises moving the demodulation reference signal of the downlink SPS communication.

23. The method of claim 18, wherein the other downlink signal is associated with at least one of:
   a synchronization signal block,
   a rate-matched resource set,
   a resource element-level reserved resource, or
   a channel state information reference signal.

24. The method of claim 18, wherein the first resource is associated with a first pattern, and wherein the third resource is associated with a second pattern.

25. The method of claim 18, wherein performing the action further comprises:
   rate matching a data portion of the downlink SPS communication around an overlapping resource of the first resource and the second resource, or
   puncturing the data portion of the downlink SPS communication on the overlapping resource.

26. The method of claim 18, wherein the first resource and the second resource are associated with a same symbol, and wherein the downlink SPS communication and the other downlink signal are associated with different spatial quasi-collocation configurations.

27. The method of claim 18, wherein the action is based at least in part on whether a network associated with the base station is configured to perform contemporaneous transmission of multiple spatial beams for the downlink SPS communication and the other downlink signal.

28. The method of claim 18, wherein performing the action comprises moving the demodulation reference signal and canceling the transmission of the downlink SPS communication.

29. A user equipment (UE) for wireless communication, comprising:
   a memory; and
   one or more processors coupled to the memory, the memory and the one or more processors configured to:
      identify a collision between a first resource for a downlink semi-persistently scheduled (SPS) communication and a second resource for another downlink signal;
      determine an action, to be performed by a base station, to mitigate the collision based at least in part on identifying the collision,
         wherein the action comprises at least one of:
            moving a demodulation reference signal of the downlink SPS communication to a third resource that is a next sequential resource after the second resource and that does not overlap the second resource, or
            canceling a transmission of the downlink SPS communication based at least in part on a threshold associated with a ratio of overlapping resources, an effective rate of the downlink SPS communication, or a limited resource availability for the demodulation reference signal of the downlink SPS communication; and
      selectively receive the downlink SPS communication or the other downlink signal based at least in part on the determination.

30. A base station for wireless communication, comprising:
   a memory; and
   one or more processors coupled to the memory, the memory and the one or more processors configured to:
      identify a collision between a first resource for a downlink semi-persistent scheduled (SPS) communication and a second resource for another downlink signal; and
      perform an action to mitigate the collision based at least in part on identifying the collision,
         wherein the action comprises at least one of:
            moving a demodulation reference signal of the downlink SPS communication to a third resource that is a next sequential resource after the second resource and that does not overlap the second resource, or
            canceling a transmission of the downlink SPS communication based at least in part on a threshold associated with a ratio of overlapping resources, an effective rate of the downlink SPS communication, or a limited resource availability for the demodulation reference signal of the downlink SPS communication.

* * * * *